United States Patent
Kennard

[15] 3,648,491
[45] Mar. 14, 1972

[54] VEHICLE ANTITHEFT ARRANGEMENT

[72] Inventor: Thomas A. Kennard, P. O. Box 279 1231 South West Street, Olney, Ill. 62450

[22] Filed: Dec. 29, 1969

[21] Appl. No.: 888,458

[52] U.S. Cl..................................70/241, 70/432, 200/44, 340/274
[51] Int. Cl.....................................E05b 65/19, E05b 47/04
[58] Field of Search..............70/241; 340/274; 292/DIG. 14; 200/44

[56] References Cited

UNITED STATES PATENTS

| | | | |
|---|---|---|---|
| 1,856,391 | 5/1932 | Keppler | 70/241 |
| 2,206,137 | 7/1940 | Tedtman | 292/97 |
| 2,940,292 | 6/1960 | Heath | 70/241 |
| 3,436,726 | 4/1969 | Dentz | 340/274 X |
| 3,504,511 | 4/1970 | Allen | 70/241 |

Primary Examiner—Albert G. Craig, Jr.
Attorney—Warren D. Flackbert

[57] ABSTRACT

An arrangement for preventing the theft of a vehicle characterized by an electrically controlled hood latch operated by the ignition key for the vehicle, and where alternative manual unlatching means is provided.

2 Claims, 5 Drawing Figures

Patented March 14, 1972

INVENTOR

THOMAS A. KENNARD

BY Warren D. Harkbert

ATTORNEY

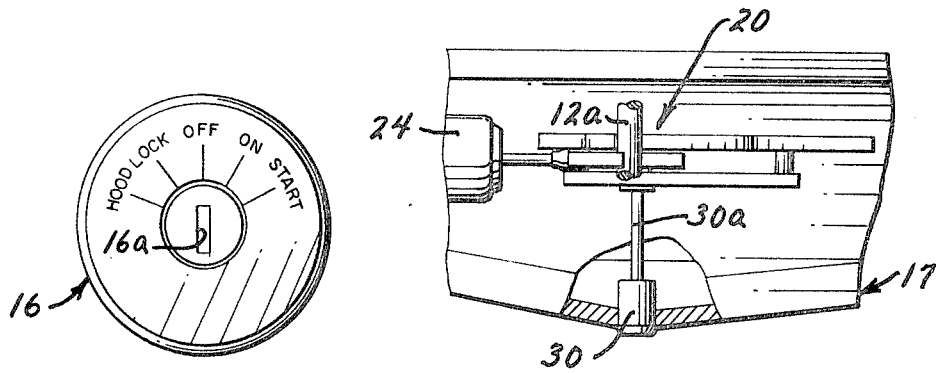
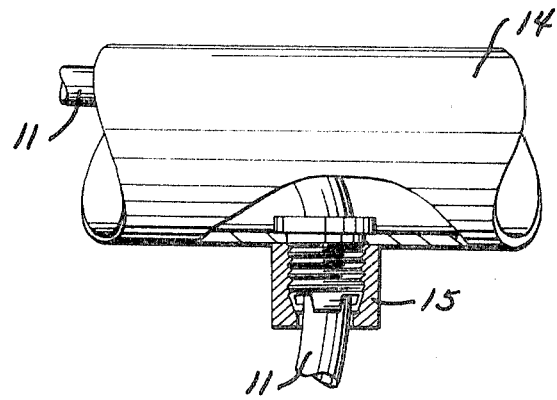
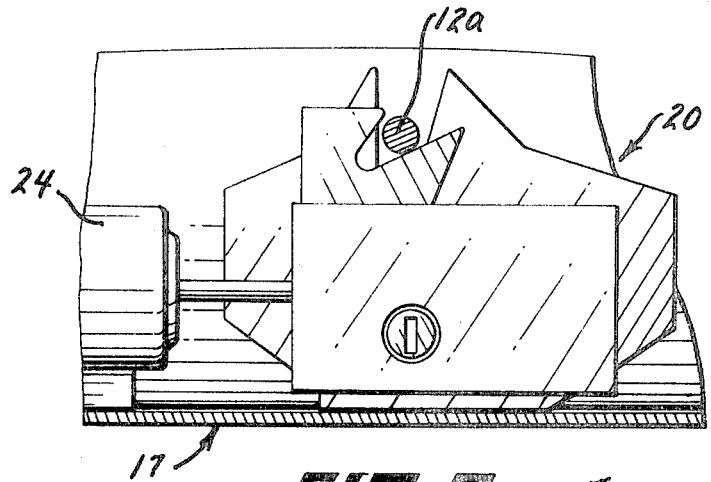
INVENTOR
THOMAS A. KENNARD

VEHICLE ANTITHEFT ARRANGEMENT

As is known, a large percentage of reported crime is attributable to automobile theft. Such crime is at an increasing rate, causing considerable loss to the owners of the stolen vehicles. Moreover, in that a majority of auto thefts is by minor offenders, the threat of an increasing number of hardened criminals can be realistically projected.

The invention provides a highly effective arrangement for preventing the theft of an automobile and, therefore, reducing the aforesaid crime rate to a minimal percentage. In simplicity, the antitheft arrangement of the invention is controlled by the ignition key of the vehicle, meaning that without the ignition key, the vehicle's engine area cannot be entered and the engine started in that the hood is locked into a closed position. In the instance of newer model automobiles, the steering wheel is also locked into a single position. Therefore, and importantly, no one can steal the vehicle if the owner retains possession of the ignition key.

Briefly, the arrangement of the invention involves a minimum number of components. In this regard, the aforesaid ignition switch is required, being operable by a conventional ignition key; an electrically controlled drive means, such as a solenoid or a piston, which engages a conventional hood latch, where the latter is either pushed or pulled to function; a signal means, such as a light on the vehicle dashboard, to indicate when the hood is in an unlocked condition; and, an alternative manual unlocking arrangement, which may be employed, for example, if the automobile electrical system becomes inoperative because of battery failure or the like.

The operation of the invention is typically such that when the ignition key is turned to an ignition switch position typically identified by the term HOOD, the drive means is actuated, causing the unlatching of the hood latch either by pushing or pulling movement. When the hood is in an unlocked condition, the aforesaid signal light is operative, perhaps in a flashing manner, to signify such. When the hood is closed to a latched position, the signal light goes out.

In other words, with the signal light out, meaning the hood is closed and locked, the hood can be opened only through use of the ignition key at the aforesaid position. The invention, therefore, provides a highly effective anti-theft arrangement for a vehicle, being positive in action and requiring a major metal cutting on the part of the thief to gain entry to the engine area. Even with the aforesaid alternative manual unlocking arrangement, the necessary key or time is required for entry, again serving to minimize the theft of the vehicle.

A better understanding of the present invention will become more apparent from the following description, taken in conjunction with the accompanying drawings, wherein FIG. 1 is a fragmentary perspective view showing the antitheft arrangement of the invention;

FIG. 2 is a detailed view, also fragmentary, looking towards the hood latching mechanism, with the outside tumbler lock and extension removed;

FIG. 3 is a top plan view, also fragmentary, comparing to the view of FIG. 2, but including the outside tumbler lock and extension;

FIG. 4 is a representation of the face of the ignition switch, showing various indicia thereon; and, FIG. 5 is a detailed view, partly fragmentary, showing the passage of a conduit for the electrical system into and from the steering column, being typical in assembly.

Figure 1:
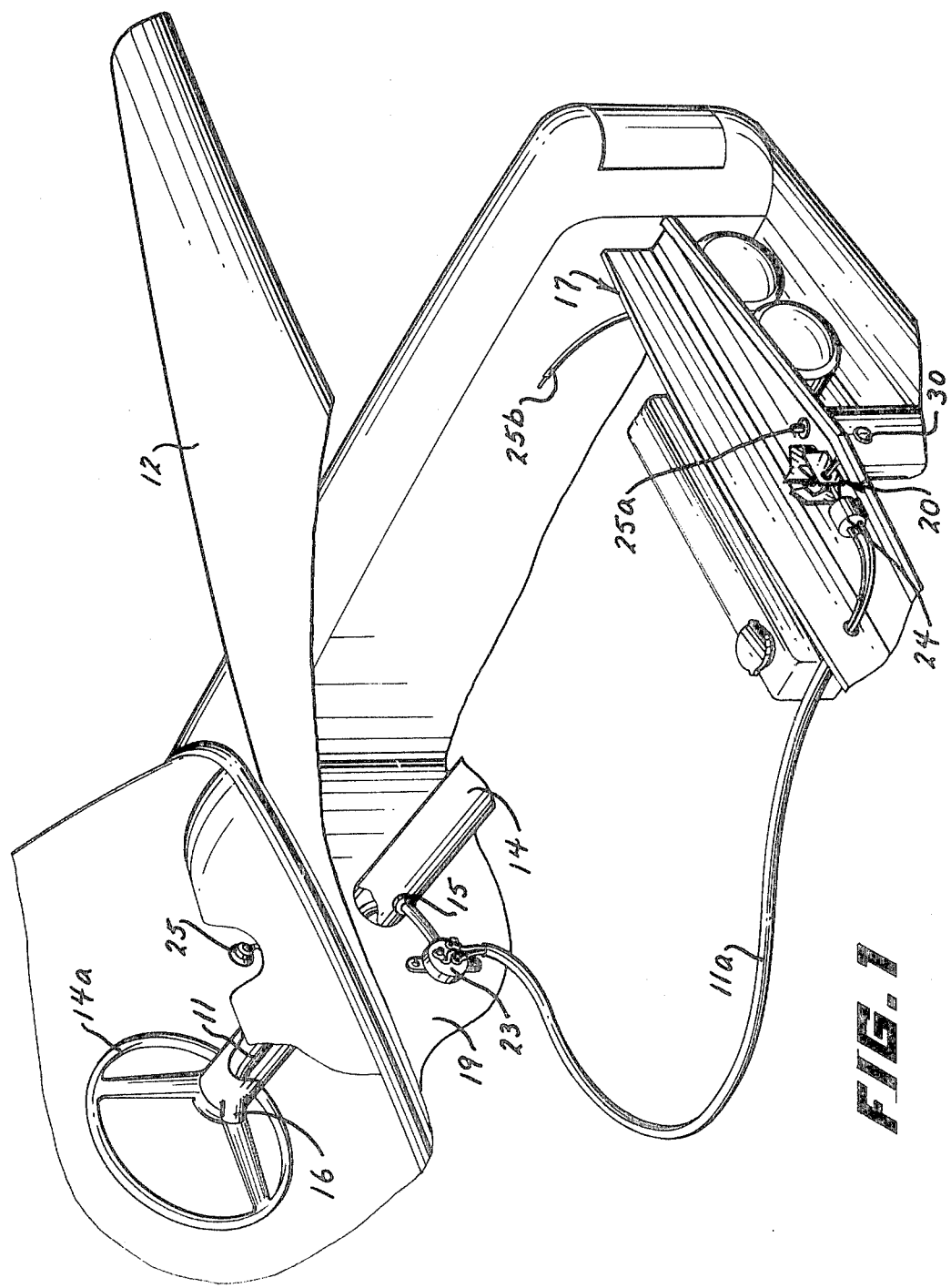

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the antitheft arrangement defining the invention is shown in conjunction with a conventional automobile, partially represented in FIG. 1. Such automobile includes a hood 12, a steering column 14 with associated steering wheel 14a, an ignition switch 16 on the steering column 14, a front frame assembly 17, and a hood latching mechanism 20 disposed on a portion of such front frame assembly 17.

With particular reference now to FIG. 4, the face of the ignition switch 16 is shown in detail, including the tumbler opening 16a for receiving an ignition key (not shown), and the various key positions. In this latter connection, and conventionally, the ignition switch 16 has an OFF position, an ON position and a START position, the latter being a cushion stop. In other words, the START position operates a solenoid which makes the starter (not shown) turn the crankshaft of the engine, such START position being momentary or until the engine is operating. Thereafter, the ignition key falls back to the ON position.

Typically, and counterclockwise with respect to the OFF position, the ignition switch 16 may further include a LOCK position for locking the steering mechanism against movement, a feature which is more prevelent on newer model automobiles. Importantly, the invention provides a new position on the ignition switch 16, again, typically, counterclockwise with respect to the aforesaid LOCK position, being termed a HOOD position.

As in the instance of the aforedescribed START position, the HOOD position is preferably a cushion stop, i.e., after the position has been attained and unlocking achieved, the ignition key is urged to the LOCK position. Obviously, the term HOOD is arbitrary, and other terms could be substituted therefore. Moreover, the ignition switch 16 could be designed in other manners, where, however, the HOOD switch incorporated with the ignition switch is of major importance, i.e., a single key can perform many functions.

The electrical circuitry for the ignition switch 16 is not disclosed, in that, as stated, the ignition switch may be variously designed. In any event, the electrical circuitry for the ignition switch 16 is part of the overall electrical system for the vehicle (not shown). It might further be noted that the switch operating the antitheft device of the invention might also be separate and, perhaps, mounted on the dashboard of the vehicle, i.e., in contrast to being incorporated with the ignition switch 16.

In any event, the latching mechanism 20 is shown in combination with a locking bar 12a depending from the hood 12 of the automobile (see FIGS. 2 and 3). The disclosed latching mechanism 20 is representative, where, as stated, conventional latching mechanisms are operated either through pushing or pulling action. In this connection, drive means 24 is provided for the latching mechanism 20, being either an electrically controlled solenoid or an electrically controlled piston. As to the latter, such may form part of the vacuum system of the automobile, and while such system is not shown for reasons of clarity of presentation, may include a manifold valve which supplies decompressed air into a storage tank, the latter connecting to the piston defining the drive means 24. As a further alternative, the piston may be operated by an hydraulic motor forming part of the hydraulic system of the automobile, where such hydraulic motor is also not shown for clarity of presentation.

In the interests of safety, the electrical circuitry to the ignition switch 16 passes through the inside of the steering column 14 in the form of a cable 11, the wall 19 between the passenger compartment of the automobile and the engine area defining a fire wall. The cable 11 passes through an opening in the steering column 14, being positioned by a sleeve 15, and connects to a terminal 23 mounted on the wall 19 within the engine compartment. Cable 11a then connects to the drive means 24.

A signal means 25, such as a lamp, is typically mounted on the dashboard 26 of the automobile, proximate the steering wheel 14a, being controlled by a switch 25a which is responsive to the position of the hood 12 and connecting through conductor 25b. In other words, with the preferred arrangement, when the hood 12 is in a latched position, contact is made with the control switch 25a and the signal lamp 25 is not lighted. Conversely, when the hood 12 is other than at a latched position, the signal lamp 25 becomes energized to indicate such condition.

With reference to FIGS. 1 and 2, a tumbler lock 30 is provided in the event manual unlatching of the hood 12 is desired. In this connection, the tumbler lock 30 has an extension 30a which passes through the front frame assembly 17 for operation of the latching mechanism 20. The tumbler lock 30 may assume other locations on the front frame assembly 17, depending upon vehicle styling or the like.

In operation, the ignition key is turned to the HOOD position, whereupon the electrical cables 11 and 11a pass current to drive means 24, actuating either the vacuum piston form or the solenoid form. Unlatching of the latching mechanism 20 is achieved either by pulling or pushing action. Thereafter, the ignition key is urged from the cushion stop of the HOOD position towards the LOCK position of the ignition switch 16. In any event, as soon as the hood 12 raises from a latched position, the signal lamp 25 glows or flashes, signifying to the operator that the hood 12 is unlatched. When the hood 12 is returned to a latched position, the signal lamp 25 is deenergized. Although not shown, hood 12 customarily has a safety latch which is released for full hood opening.

From the preceding, it should be apparent that the ignition key serves as a prime safety factor against automobile theft in the practice of the invention. In other words, the operator can visually know if the hood 12 is not in a fully latched position by reason of the illumination of the signal lamp 25. Once the hood 12 is closed, the operator knows that with the ignition key in his possession, the hood 12 cannot be opened. Obviously, with the ignition key removed, and the steering mechanism in a locked position and the hood in a locked condition, the chances of automobile theft have been minimized to almost a zero potential. As to the alternative mechanical arrangement for operating the latching mechanism 20, including tumbler lock 30, a key is required, and if any intention was present to force such lock, it probably would be quite obvious to a passerby, or at least require added time.

The above description should be considered illustrative, where, of course, the location of certain of the components may be changed, and modifications made from one type of automobile to another. Actually, while the anti-theft arrangement described herein is preferably original equipment for an automobile, it could be sold in kit form for use on older models of automobiles, such being within the spirit of the invention.

I claim:

1. An antitheft arrangement for a vehicle having a hood and a hood latching mechanism comprising an electrical system including an ignition switch, drive means for said latching mechanism, a separate hood latch position on said ignition switch in addition to the normal ignition positions of "on" and "off", selectively completing an electrical circuit for actuating said drive means, and key operated lock means independently releasing said latching mechanism.

2. The antitheft arrangement of claim 1 where a signaling means indicates the unlatching of said hood.

* * * * *